United States Patent [19]

Regnier et al.

[11] 3,991,276

[45] Nov. 9, 1976

[54] TIME-SPACE-TIME DIVISION SWITCHING NETWORK

[75] Inventors: Albert Regnier, Issy-les-Moulineaux; Jean-Paul Lager, La-Celle-St-Cloud, both of France

[73] Assignee: International Standard Electric Corporation, New York, N.Y.

[22] Filed: Nov. 22, 1974

[21] Appl. No.: 526,075

Related U.S. Application Data

[63] Continuation of Ser. No. 365,458, May 31, 1973, abandoned.

[30] Foreign Application Priority Data

June 1, 1972 France .............................. 72.19696

[52] U.S. Cl. .......................................... 179/15 AT
[51] Int. Cl.² ........................................... H04J 3/00
[58] Field of Search ....................... 179/15 AT, 18 J

[56] References Cited
UNITED STATES PATENTS 3,894,189  7/1975  Edstrom et al. ................ 179/15 AT Primary Examiner—Thomas W. Brown
Attorney, Agent, or Firm—J. B. Raden; M. M. Chaben

[57] ABSTRACT

In a large time-space-time division switching network, particularly one employing a multistage space-division switch, one time-division elementary time is too brief to enable transmission of addresses of crosspoints to be completed through all the stages of the multistage switch, and also provide for transmission of the speech sample. To cope with this situation, two successive network elementary times are used, each elementary time being divided into two half-times, i.e., a first half-time and a second half-time. First half-times are used for transmitting addresses of crosspoints to be closed immediately. Second half-times are used for storing data concerning further crosspoint addresses plus a speech sample. Addresses are propagated through a speech sample path according to a "staggered operation", thereby reducing the requirements for memory dedicated to crosspoint addresses.

8 Claims, 2 Drawing Figures

TIME-SPACE-TIME DIVISION SWITCHING NETWORK

This is a continuation of application Ser. No. 365,958 filed 5/31/73 now abandoned.

BACKGROUND OF THE INVENTION

1. Field of the Invention

The present invention relates to time-division switching networks for transmitting PCM (Pulse Coded Modulation) speech signals and, more particularly, to means and processes for propagating speech samples and space-division switching cross-point addresses through large size networks including, at least, one time-division switching stage and one space-division multistage switch.

2. Description of the Prior Art.

Such time-division switching networks are well known and may be parts of local or toll exchanges. They are designed for handling a great number of ingoing or outgoing time-division channels. Every time-division stage includes separate time-division groups, each group being respectively connected to a separate individual link of the space-division switch.

In a known manner, the purpose of the space-division switch is to extend network capacity over limits resulting from present pure time-division switching network technology, and utilization of a space-division switch together with ingoing and outgoing time-division groups makes it possible to attain very large size networks.

In high-traffic large size networks, the space-division switch advantageously comprises several cascaded stages. The resulting drawback is that speech sample transfer time, via the space-division switch, increases as the number of stages. Transferring a sample through the space-division switch during a single network elementary time becomes difficult, whereas it may be performed readily in networks having smaller capacity.

Furthermore, the various cross-points contributing to a sample propagation path must be addressed. Due to the large number of time-division channels connected to networks of this kind, memory capacity reserved in the network for cross-point addresses is particularly important.

SUMMARY OF THE INVENTION

A purpose of the present invention is then to provide means and processes permitting, on the one hand, to design large capacity time-division switching networks including a space-division multistage switch through which speech sample transmission is longer than the considered time-division network elementary time, and, on the other hand, to substantially reduce the memory capacity reserved for cross-point addresses with respect to that needed in known means and processes.

According to a feature of this invention, there is provided a time-division network with, at least, a time-division stage and a space-division multistage switch, which incudes means for sequentially propagating step-by-step, through a speech sample propagation path as it is established, at least part of addresses of cross-points pertaining to that path and to the considered speech sample, each step leading through a predetermined number of cross-points of the considered path either at least part of the following cross-point addresses, if any, or the speech sample which follows them on that path.

The time-division switching network also comprises means for simultaneously propagating addresses of the various cross-points of a path.

According to another feature of this invention, within a time-division network having an input time-division stage which comprises separate time-division groups, each time-division group having a speech memory connected, via a separate so-called outgoing register, to a separate input link of the first space-division switch stage, network propagating means include hereunder defined space-division address memories, transfer registers, space-division address memory output registers and addressing registers.

In each time-division group, a space-division address memory is associated to the speech sample memory and has as many rows as in the speech sample memory and a number of columns at least equal to the number of bits needed for addressing the various crosspoints of any sample propagation path.

In each input link of each space-division switch stage, a transfer register is mounted which has a capacity at least equal to the number of speech sample bits.

A crosspoint addressing register is associated to each input link of each space-division switch stage, and it is so connected and designed as to be able to receive the binary address of any one of the crosspoints capable to connect the considered associated input link to an output of the stage reached by that link.

A process for propagating crosspoint addresses and speech samples in a switching network according to this invention comprises the following steps:

addresses of crosspoints determining a sample propagation path through the space-division switch stages are associated to the corresponding speech sample;

at the beginning of one of the two portions of each time-division network elementary time, hereinafter defined as first elementary half-time, the transfer of all crosspoint addresses contained in input time-division group output registers is triggered toward next registers;

at the beginning of the other portion of each time-division network elementary time, hereinafter defined as second elementary half-time, the transfer of speech samples contained in input time-division group outgoing registers is triggered toward next registers;

at the beginning of each elementary half-time, the transfer of binary data (samples or addresses) contained in transfer registers located at space-division stage inputs — save those of the last space-division stage — is triggered toward the next registers;

at the beginning of one elementary half-time out of two, the transfer of binary data contained in transfer registers located at last space-division stage inputs is triggered toward next registers, such an elementary half-time being the first half-time if space-division stage number is even and being the second half-time if space-division stage number is odd.

BRIEF DESCRIPTION OF THE DRAWINGS

Other features of the present invention will appear more clearly from the following description of an embodiment, the said description being made in conjunction with the accompanying drawings, wherein.

DESCRIPTION OF PREFERRED EMBODIMENTS

Figure 1:
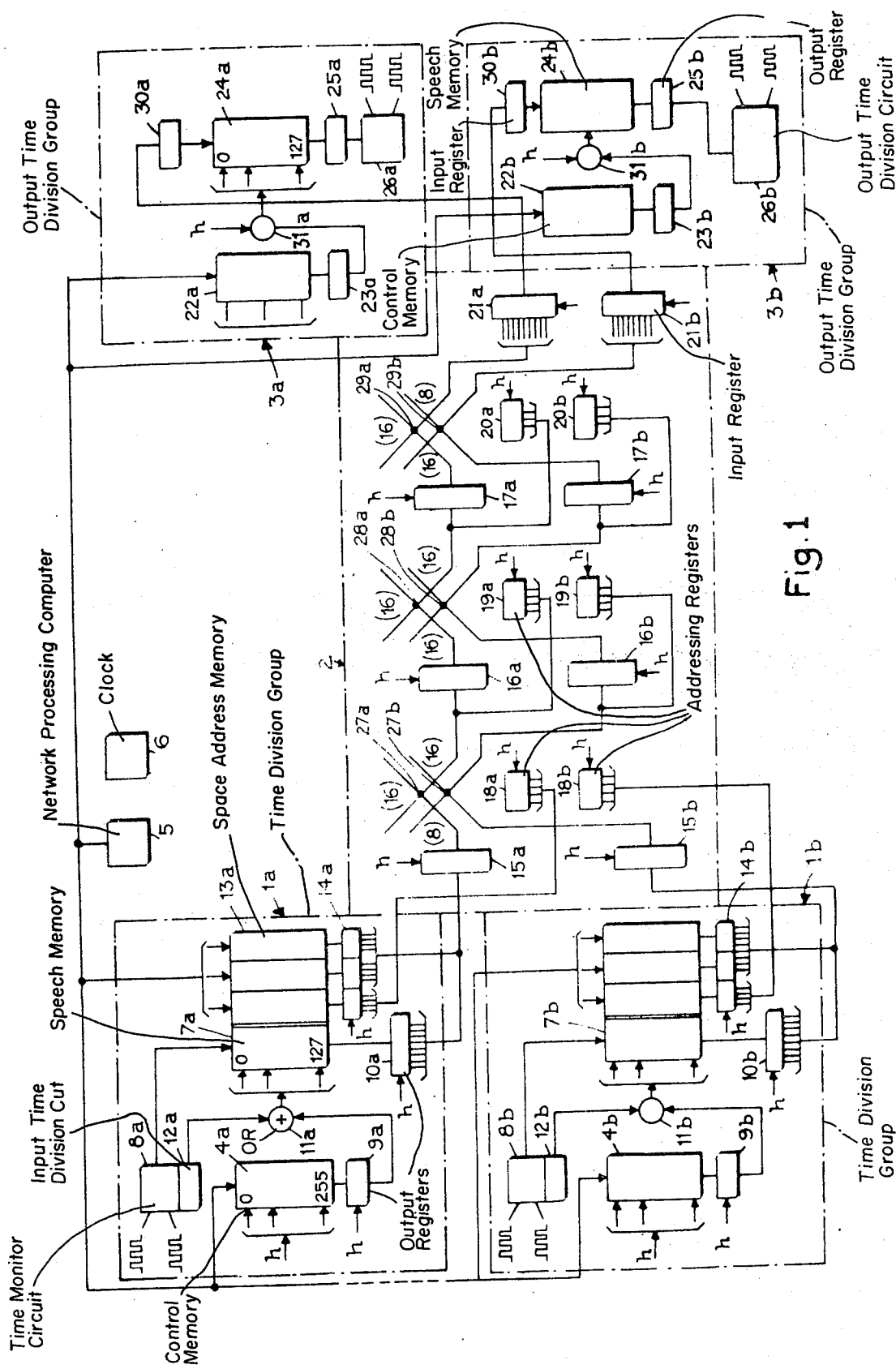
FIG. 1 is a schematic diagram of an embodiment of a network according to this invention.

The embodiment shown in FIG. 1 relates to a time-space-time division network, but may apply to any combination of time- and space-division stages without limitation. Attention is directed to co-pending applications Ser. No. 291,995 filed Sept. 25, 1972 and Ser. No. 350,053, filed Apr. 11, 1973 for additional information respepcting related systems.

The network shown in FIG. 1 comprises an input stage including a plurality of separate identical time-division groups, such as 1a and 1b, a cascaded three-stage space-division switch 2 and an output stage including a plurality of separate identical output time-division groups, such as 3a and 3b.

Each input time-division group having an identical structure, only the group 1a will be described which conventionally includes a speech memory 7a supplied by an input time-division circuit 12a.

Each row of the memory 7a can contain a speech sample, such a sample being made of eight bits.

Each speech sample received from circuit 12a is then stored in a given row of speech memory 7A under control of the time monitor circuit 8a. The address of each given row is conventionally stored in a row of the control memory 4a, to the corresponding storage being performed by a network processing computer 5 which may be selected from among conventional processors used for switching systems. Exemplary computers are the ITT 1600 and ITT 3200 which were designed specifically for use with switching systems, as demonstrated in Pat. Nos. 3,557,315 and 3,562,716 as well as in the literature, as described in Electrical Communication, volume 46, number 4, 1971, pages 233 – 245. Addresses are sequentially read from memory 4a under control of pulse supplied from network clock 6, via a connection indicated by "h".

Memories 4a and 7a are respectively provided with output registers 9a and 10a controlled by clock 6, via connections h. Register 9a and circuit 12a actuate memory 7a, via an OR-type circuit 11a.

Any address read from control memory 4a is transferred to register 9a which addresses the corresponding row of memory 7a. The sample, which arbitrarily may be designated "E", contained in the addressed row of 7a, is transmitted via the register 10a to be transferred again, via the space division network 2 towards the concerned output time-division group, for instance to group 3a.

In this respect, it is necessary to find a propagation path connecting register 10a to input register 21b of group 3b, via the three stages of switch 2.

In a conventional manner, addresses of concerned crosspoints which determine the sample propagation path, are provided from the concerned computer 5. Those crosspoint addresses are stored in a space-address memory pertaining to each input time-division group, such as 13a for group 1a.

Memory 13a is associated to speech memory 7a and comprises as many columns as bits needed for addressing sample propagation path crosspoints through space-division network 2.

In the described embodiment, the first space-division stage of network 2 includes sixteen matrices, each matrix having eight input links and sixteen output links. The second space-division stage includes sixteen matrices, each matrix having sixteen input links and sixteen output links. The third space-division stage includes sixteen matrices, each matrix having sixteen input links and eight output links. Each input link of the first stage is associated to an input time-division group 1a, so that there may be, for example, 128 input time-division groups, which corresponds to half the number of time-division network elemetary times that in this example would be 256.

Thus, each input link of the first stage may be connected to sixteen output links of the same stage through sixteen crosspoints, so that four bits are needed for use in addressing one crosspoint out of sixteen available for establishing such a connection. Likewise, each input of the second stage may be connected to sixteen output links and crosspoint addressing needs four bits. However only three bits are needed for addressing crosspoints in the third stage, or for use in connecting one input link to one output link out of eight.

Therefore, each row of crosspoint address memory 13a may contain $4 + 4 + 3 = 11$ bits.

To each row of speech memory 7a there is associated a row of the space address memory 13a. Memory 13a contains addresses of crosspoints determining the propagation path for a speech sample such as E above stored in the corresponding row of memory 7a.

Any time-division address provided from control memory 4a triggers simultaneous transfers, on the one hand, of the sample stored in the row designated by that address in speech memory 7a and, on the other hand, of space addresses stored in the corresponding row of the associated memory 13a. Then, the speech sample is written in output register 10a and corresponding crosspoint addresses written in a register 14a, which is divided in three portions, which are respectively alloted to addresses, which are not illustrated in the Figures but may be designated $AS_1$, $AS_2$ and $AS_3$, for each of the three space-division stages, respectively.

The two registers 10a and 14a are sequentially controlled by clock 6, via connections h, clock 6 delivering control signals particularly at times $t$ spaced by T/2, T being the network elementary time duration.

Figure 2:
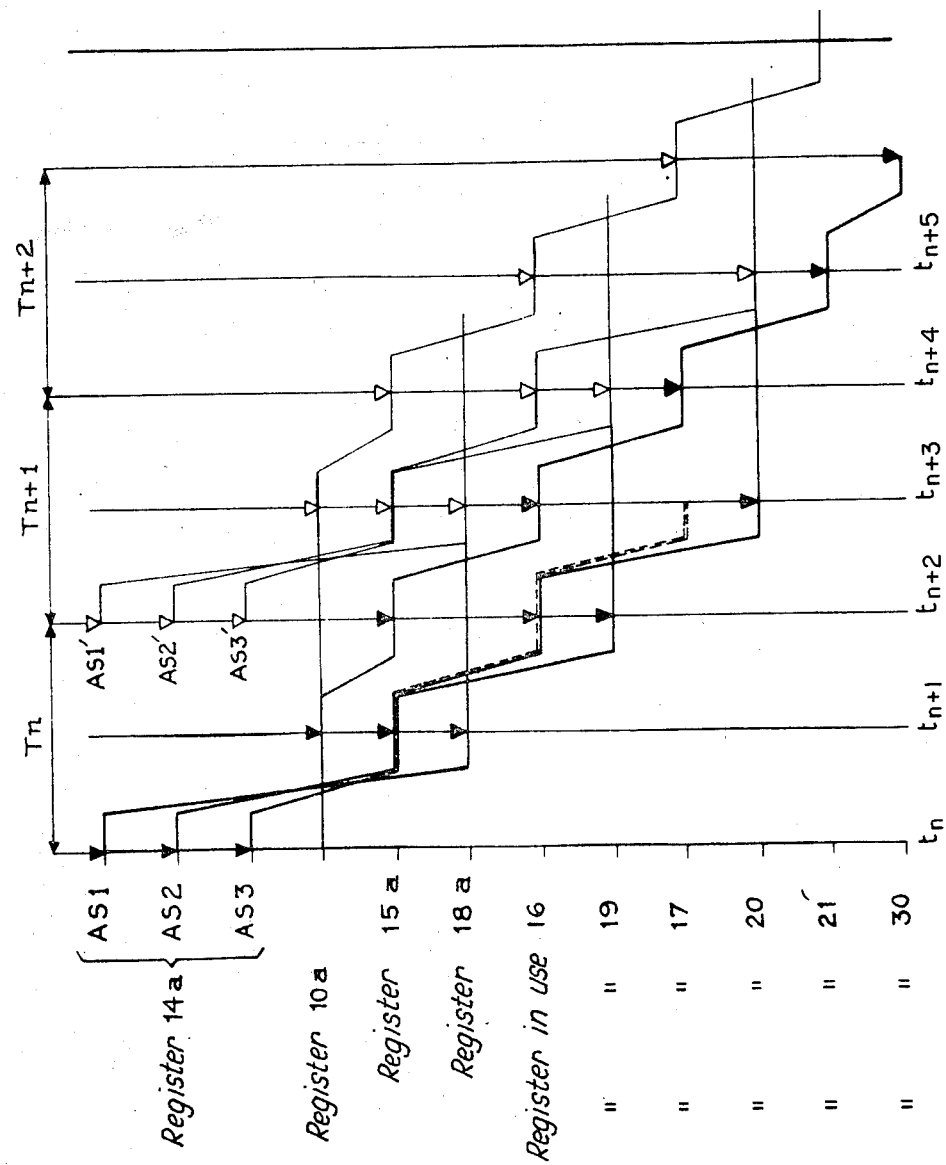
FIG. 2 is a time diagram concerning the propagation process according to this invention and relating to two successive samples from a same time-division group.

In the described embodiment, network elementary times T are then divided into two operation times. Register 14a is first controlled at the beginning of a time $t_n$ corresponding to the beginning of a network elementary time $T_n$ (FIG. 2). Bits contained in register 14a are transmitted through eleven outputs. The four first outputs corresponding to address AS1 of the first crosspoint 27a involved in the propagation of sample E, supply the four inputs of an addressing register 18a associated to the input link which group 1a is connected to. Thus, register 18a receives the four bits corresponding to the address of that crosspoint 27a and triggers its operation controlled by clock 6.

Since each input link of the first stage is associated to an addressing register, that first stage includes 128 addressing registers 18, each being respectively connected by four inputs to one of the output registers 14 of one of the 128 input time-division groups.

Simultaneously, during time $t_n$, addresses AS2 and AS3 of crosspoints in the second and third stages are transmitted to a transfer register 15a associated to the considered input link. Thus, there are also 128 transfer registers for the 128 input links of the first stage in the described embodiment.

Transfer register 15a has a capacity equal, at least, to speech sample bit number. It has seven of its eight inputs connected to the seven remaining outputs of register 14a, so as to receive the seven bits corresponding to second and third stage crosspoint addresses.

At time $t_{n+1}$, speech sample E is in register 10a, the first concerned crosspoint 27a is activated and addresses of the two other concerned crosspoints are stored in register 15a (FIG. 2).

Then, clock 6 simultaneously triggers, during time $t_{n+1}$, on the one hand, the transfer of addresses AS2 and AS3 of the two unoperative concerned crosspoints, via the first crosspoint 27a, and, on the other hand, the transfer of sample E to register 15a.

In this respect, register 15a has its eight inputs connected to the eight outputs of register 10a.

At time $t_{n+2}$ (FIG. 2), sample E is stored in 15a, the first crosspoint 27a is still operative, addresses AS2 and AS3 of the two further crosspoints are stored in a second transfer register 16a connected to outputs of crosspoint 27a. Moreover, the four bits of the address of the second stage crosspoint are also stored in an addressing register 19a connected to the corresponding outputs of crosspoint 27a.

In this respect, each first stage crosspoint has, on the one hand, four outputs connected to an addressing register 19 and, on the other hand, its eight outputs connected to the eight inputs of a transfer register 16.

Thus, the second stage includes 256 input transfer registers and 256 addressing registers.

During time $t_{n+2}$, addresses AS2 and AS3 are transferred via the second concerned operative crosspoint, i.e. 28a, and sample E is transferred to register 16a, via 27a.

At time $t_{n+3}$ (FIG. 2), sample E is stored in 16a, the second crosspoint 28a is activated, addresses AS2 and AS3 are stored in a third transfer register 17a connected to the eight outputs of crosspoint 28a and, in addition, address AS3 is stored in an addressing register 20a connected to the three concerned outputs of crosspoint 28a.

Thus, the third stage includes 256 input transfer registers and 256 addressing registers.

During time $t_{n+3}$, sample E is transferred, via crosspoint 28a, to register 17a and the third concerned crosspoint 29b is activated. Conversely, addresses AS2 and AS3 are expelled from register 17a by sample E and are not further transmitted because register 21a is not controlled by clock 6.

At time $t_{n+4}$ or $T_{n+2}$, sample E is stored in 17a, the third point 29b is being activated, clock 6 triggers the transfer of sample E to transfer register 21b connected to the eight outputs of crosspoint 29b. Thus, the third stage has also 128 output transfer registers.

During time $t_{n+5}$, sample E is transferred from register 21b to input register 30b of output time-division group 3b.

Outgoing groups, such as 3b, are conventional and, for instance the group 3b basically includes a control memory 22b with its output register 23b, a speech memory 24b with its input registers 30b and output registers 25b, and an output time-division circuit 26b.

Transmission operations through that group are conventional and will not be further described hereinafter, as being well known to those skilled in the art.

In a conventional manner, each time-division group operates in a separate manner, under the control of the network clock 6 and, as a result, simultaneous transfers of 128 speech sample may occur at the same time and at the same propagation step, i.e. transfers of 128 samples from input time-division group outgoing registers to first space stage input transfer registers.

Likewise, as shown in the diagram of FIG. 2, the transfer of the binary data comprising a speech sample and concerned crosspoint addresses may be initiated at the beginning of each elementary time T.

Furthermore, the memory capacity needed for addressing crosspoints is reduced if compared to that of a network including a memory for crosspoint addresses per output stage link. Indeed, according to this invention, in the described embodiment, each of the 128 ingoing time-division groups includes a crosspoint address memory with 128 rows, each row having 11 bits. The necessary memory capacity is then of $128^2$ $(4+4+3) = 180(10)^3$ bits or of $360(10)^3$ bits, if speech sample memories are duplicated for safety reasons.

In the case of a network including a crosspoint address memory per output stage link, the need would be in fact:

$16 \times 16 \times 256 \times 3$ No. $197(10)^3$ bits for the first stage comprising 16 16-output 8-input matrices, that is therefore 256 memories with 256 memories with 256 3-bit rows;

$16 \times 16 \times 4$ No. $262(10)^3$ bits for the second stage comprising 16 16-output 16-input matrices, that is therefore 256 memories with 256 3-bit rows;

$16 \times 8 \times 256 \times 4$ No. $131(10)^3$ bits for the third stage comprising 16 8-output 16 input matrices, that is therefore 128 memories with 256 4-bit rows;

that is a total address memory capacity of more than $590(10)^3$ bits, instead of $360(10)^3$ bits.

While the principles of the present invention have hereabove been described in relation with a specific embodiment, it must be clearly understood that the said description has only been made by way of example and does not limit the scope of this invention.

We claim:

1. A time-space-time division switching network employing two successive network elementary times, hereinafter defined respectively as first and second half-times, for transmission, the network comprising propagation means for serially interconnecting an input time division group, a multistage space-division switch, and an output time-division group, said propagation means enabling the sequential propagation of signals during first and second half-times step-by-step over a speech sample propagation path as it is established from the input time-division group through the multistage space-division group to the output time-division group, said first half-times being used to transmit signals including the addresses of crosspoints to be closed immediately, said second half times being used to transmit signals pertaining to that path and related speech samples, and the propagation means incuding means at each step to enable the transmission, through predetermined crosspoints of the considered path of any successive next crosspoint addresses, or of the speech sample which follows them on that path.

2. The invention according to claim 1, comprising means for simultaneously propagating addresses of the various crosspoints of a speech sample propagation path.

3. The invention according to claim 1, in which the predetermined crosspoints passed through in the course of one step number at least one.

4. The invention according to claim 1, in which the propagation means comprises: a speech sample memory in each input stage time-division group, said memory being connected to an individual input link of the first space-division switch stage, via an individual outgoing register, a space-division address memory in each input stage time-division group, each space-division address memory including as many rows as in the speech sample memory and a number of columns at least equal to the number of bits needed for addressing the various crosspoints in any sample propagation path, an output register associated with each space-division address memory, a transfer register per input link of each of the space-division switch stages, each register mounted on a link having a capacity at least equal to the speach sample bit number, and, possibly, to the number of bits needed for addressing crosspoints located in the following space-division switch stages in any sample propagation path, if this last number is higher than the first one, a crosspoint addressing register per input link of each of the space-division switch stages, each addressing register associated to a link being so connected and designed as to be able to receive the binary address of any crosspoint capable to connect the considered input link to an output of the stage including the said link, and a speech sample memory in each time-division group of the output time-division stage, such a memory being connected to an output link of the space-division switch, via at least a register.

5. The invention according to claim 4, in which output register outputs which transmit in parallel a space-division switch input stage crosspoint binary address for a speech sample transferred through the input group including the output register, are respectively connected to inputs of the addressing register associated to the space-division switch input stage input link alloted to the considered time-division group, and output register outputs, which parallel transmit space-division switch stage crosspoint binary addresses — save input stage crosspoint binary address — for a speech sample transferred through the input group including the output register, are each connected to a corresponding input of the transfer register associated to the input link of the space-division switch input stage, which is alloted to the considered time-division group.

6. The invention according to claim 5, in which inputs of a crosspoint addressing register associated to any stage other than the space-division switch input stage, are each connected to a corresponding input of the transfer register associated to the same input link as the considered addressing register, each addressing register comprising at least as many inputs as bits needed for addressing a crosspoint capable of connecting said input link to an output of the stage which is associated to the two registers and the said input link.

7. A process for propagating crosspoint addresses and speech samples through a time-space-time division switching system including at least first and last space division stages comprising the steps of:

storing a speech sample and storing the addresses of a plurality of crosspoints which determine a propagation path through space-division switch stages for the speech sample;

at the beginning of a first time-division network elementary time, hereinafter defined as the first elementary half-time, transferring the address of a first one of said crosspoints to a transfer register, and the addresses of subsequent crosspoints to addressing registers;

at the beginning of a second time-division network elementary time, hereinafter defined as the second elementary half-time, closing the first crosspoint, clearing the address from the transfer register and transferring the speech sample to the transfer register;

at the beginning of each successive elementary half-time, transferring binary data (samples or addresses) contained in registers located at space-division stage inputs toward the next registers; at the beginning of one elementry half-time out of two, transferring binary data contained in transfer registers located at last space-division stage inputs out of said last space division stage, such an elementary half-time being the first half-time when a space-division stage number is even and being the second half-time when a space-division stage number is odd.

8. A process of propagation according to claim 7, including the step of activating each concerned crosspoint from the beginning of the half-time following the transfer of its address into the concerned addressing register, for a period of time allowing transfer of all the following concerned addresses during a half-time and transfer of the concerned sample during the next half-time.

* * * * *